US006547218B2

United States Patent
Landy

(10) Patent No.: US 6,547,218 B2
(45) Date of Patent: Apr. 15, 2003

(54) RATCHET AND CAM BUCKLE TENSIONING ASSEMBLY AND METHOD FOR USING SAME

(76) Inventor: Richard Landy, 30945 Romero Cyn, Castaic, CA (US) 91384

(*) Notice: Subject to any disclaimer, the term of this patent is extended or adjusted under 35 U.S.C. 154(b) by 0 days.

(21) Appl. No.: 09/899,015

(22) Filed: Jul. 6, 2001

(65) Prior Publication Data

US 2001/0045548 A1 Nov. 29, 2001

Related U.S. Application Data

(63) Continuation of application No. 09/133,955, filed on Aug. 14, 1998, now abandoned.
(60) Provisional application No. 60/087,270, filed on May 29, 1998.

(51) Int. Cl.[7] ............................. B66F 3/00; B21F 9/00
(52) U.S. Cl. .................................... 254/217; 24/68 CD
(58) Field of Search ........................ 254/217, 218, 254/237, 243, 245, 248, 250, 251, 252, 257, 260; 410/100, 103; 24/68 R, 69 R, 69 ST, 69 CT, 68 CD, 68 E, 71.2; 244/74

(56) References Cited

U.S. PATENT DOCUMENTS

| | | | | |
|---|---|---|---|---|
| 3,749,366 A | * | 7/1973 | Brucker ................... | 24/68 CD |
| 4,510,652 A | * | 4/1985 | van Iperen ................... | 24/198 |
| 4,622,721 A | * | 11/1986 | Smetz et al. ............. | 24/68 CD |
| 5,116,453 A | * | 5/1992 | Niedrig ........................ | 100/32 |
| 5,416,952 A | * | 5/1995 | Dodge ........................ | 24/68 A |
| 5,611,520 A | * | 3/1997 | Soderstrom ............... | 24/68 CD |
| 5,904,341 A | * | 5/1999 | Norrby ........................ | 254/214 |
| 6,102,371 A | * | 8/2000 | Wyers ..................... | 24/68 CD |
| 6,158,092 A | * | 12/2000 | Huang ..................... | 24/68 CD |
| 6,178,603 B1 | * | 1/2001 | Lillig ........................ | 24/132 R |
| 6,195,848 B1 | * | 3/2001 | Jackson et al. .......... | 24/68 CD |

* cited by examiner

*Primary Examiner*—Emmanuel Marcelo

(57) ABSTRACT

A ratchet and cam buckle tensioning assembly or strap tensioner, interposed between a lashing strap tensioned by the ratchet buckle and a lead strap tensioned by the cam buckle. The invention enables an operator to quickly and conveniently pre-tension the lashing and lead straps by removing an un-tensioned length of the lead strap without having to operate the ratchet buckle. The tensioning assembly includes a ratchet buckle for tensioning the lashing strap in stepped increments and a cam buckle for slidingly adjusting the lead strap. The cam buckle housing and the ratchet buckle frame member are a unitary member, forming an single, integrated tensioning assembly. Alternately, the cam buckle is permanently attached adjacent to the ratchet buckle. The cam buckle includes a housing adapted to slidably receive the lead strap. The housing has a pressure plate with a first restraining surface, such as a friction surface, over which the lead strap slides. A pawl is movably mounted, such as by pivoting, to the housing. The pawl has a second restraining surface and is biased in an engaged position to restrain the lead strap between the first and second restraining surfaces so as to prevent movement of the lead strap in one or both directions. The pawl also may assume a disengaged position wherein the lead strap can move freely between the first and second restraining surfaces.

30 Claims, 3 Drawing Sheets

RATCHET AND CAM BUCKLE TENSIONING ASSEMBLY AND METHOD FOR USING SAME

This application is a continuation of application Ser. No. 09/133,955, filed Aug. 14, 1998, now abandoned and claims the benefit of U.S. Provisional Application No. 60/087,270, filed May 29, 1998.

BACKGROUND OF THE INVENTION

1. Field of the Invention

The present invention relates generally to fastening devices and, more particularly, to ratchet buckles, strap tensioners, cargo retraining devices and the like for tightening and tensioning straps.

2. Related Art

Ratchet buckles, also commonly referred to as cargo restraining devices and strap tensioners are commonly used for tightening and securing straps, ropes, chains or other tie-down tensioning lines. Generally, conventional ratchet buckles include a ratchet mechanism and a securing mechanism for retaining the strap in a tensioned condition. Conventional ratchet buckles for tightening and/or tensioning straps are described, for example, in U.S. Pat. Nos. 2,889,136, 4,185,360, 4,227,286, 4,199,182, 4,324,023, 4,570,305, 4,542,883, 5,282,296, and others.

Although such ratchet buckles are quite effective in tensioning straps, there are a number of drawbacks associated with using conventional ratchet buckles under certain circumstances. One such drawback of is that a limited length of the lashing strap is wrapped around the drum or reel of the ratchet buckle in response to a single tensioning operation. As a result, a large number of tensioning operations must be performed to uptake lengths of the lashing strap. This oftentimes requires significant time performing numerous manipulations of the ratchet buckle.

Another drawback manifests itself when the conventional ratchet buckles are secured and fully tensioned, restraining a load under a tensioned lashing strap. It is often difficult to release the tension on the lashing strap to remove or adjust a secured load. As a result, fragile loads are sometimes damaged in the process of loosening or de-mounting the lashing strap and ratchet buckle.

What is needed, therefore, is an apparatus that enables an operator to quickly and easily adjust a lashing strap when performing tightening/securing and loosening/releasing operations with a ratchet buckle.

SUMMARY OF THE INVENTION

The present invention is a ratchet and cam buckle tensioning assembly, interposed between a lashing strap tensioned by the ratchet buckle and a lead strap tensioned by the cam buckle. The tensioning assembly enables an operator to quickly and conveniently pre-tension the lashing and lead straps by removing an un-tensioned length of the lead strap without having to operate the ratchet buckle. This advantageously enables the operator to utilize the ratchet buckle to tension the straps only when the requisite tensioning force cannot be provided by an unaided operator. That is, the ratchet buckle may be operated only to tension a lashing strap that has been pre-tensioned with the cam buckle, thereby facilitating the use of the combined assembly. As a result, the present invention saves an operator from having to operate the ratchet buckle multiple times to uptake slack in the lashing strap when the leveraged tensioning force provided by such a ratchet buckle is unnecessary.

In one aspect of the invention, a tensioning assembly for tightening and releasing a lashing strap and a lead strap is disclosed. The tensioning assembly includes a ratchet buckle for tensioning the lashing strap in stepped increments and a cam buckle for slidingly adjusting the lead strap. The cam buckle is connected adjacent to the frame member by an apparatus other than the lead and lashing straps. The ratchet buckle may be any known ratchet buckle. In one embodiment, the ratchet buckle includes a bifurcated frame member having a pair of opposing parallel arms between which a reel member and ratchet wheels are rotatably mounted. A latching plate is also slidably mounted between the arms for latching the ratchet wheels when the ratchet wheels are not being rotatably driven. The ratchet buckle also includes a lever member rotatably mounted on the reel member and having a pair of opposing side members between which a ratchet drive plate is slidably mounted for engaging and driving the ratchet wheel when the lever member is actuated.

In one preferred embodiment, the cam buckle housing and the ratchet buckle frame member are a unitary member, forming an single, integrated tensioning assembly. In another preferred embodiment, the cam buckle is permanently attached adjacent to the ratchet buckle. In one particular embodiment, the cam buckle is attached to the ratchet buckle with an intermediate strap. In this embodiment, the ratchet buckle frame member includes a first cross bar supported between the pair of opposing frame member arms, and the cam buckle includes side members attached to opposing sides of the pressure plate with a second cross bar supported between such side members. The intermediate strap is fixedly connected to the first and second cross bars, and is of such a length so as to place the cam buckle adjacent to the ratchet buckle.

In an alternative embodiment, the cam buckle includes a housing adapted to slidably receive the lead strap. The housing has a pressure plate with a first restraining surface over which the lead strap slides. Also included in the cam buckle is a pawl movably mounted to the housing. The pawl has a second restraining surface and is biased in an engaged position to restrain the lead strap between the first and second restraining surfaces so as to prevent movement of the lead strap in one or both directions. The pawl also may assume a disengaged position wherein the lead strap can move freely between the first and second restraining surfaces. In one embodiment, the cam buckle is unidirectional, preventing movement of the lead strap a single direction. Particularly, the pawl, when in the engaged position, prevents movement of the lead strap in a direction that loosens the lead strap while allowing movement of the lead strap in a direction that tensions the lead strap. In one specific embodiment, the housing has a rear portion facing toward the ratchet buckle and a front portion facing away from the ratchet buckle. The lead strap travels from the front portion to the rear portion of the housing to tension the lead strap and from the rear portion towards the front portion to loosed the lead strap. In this embodiment, the pawl is constructed and arranged to engage and prevent movement of the lead strap in a direction from the front portion of the housing toward the rear portion of the housing while allowing movement of the strap from the rear portion of the housing to the front portion of the housing.

In one embodiment, the pawl is pivotally mounted to the housing. In a specific implementation, the housing comprises a pressure plate and a pair of substantially parallel side members attached to the pressure plate. The pawl is pivotally mounted between the pair of housing side members such that the second restraining surface is in opposing juxtaposition to the first restraining surface. Generally, the cam buckle includes means for maintaining securely the first retraining surface of the pawl against the first restraining surface of the housing. In the embodiment wherein the pawl is pivotally mounted to the housing, the cam buckle preferably includes a torsion spring disposed about one end of the pivot pin. The torsion spring has a first extension arm in contact with the pawl and a second extension arm in contact with the housing. The torsion spring has a torque sufficient to maintain securely the first retraining surface of the pawl against the first restraining surface of the housing. The first and second restraining surfaces may be any suitable surfaces for retraining the selected type of lead strap. In one preferred embodiment wherein the lead strap is a webbing, the second restraining surface comprises serrations while the first restraining surface comprises grooves.

In another aspect of the invention a cargo retraining device is disclosed. The cargo retraining device includes a lashing strap having a free end and a securable end and a lead strap having a free end and a securable end. A ratchet buckle, interposed between the lashing strap and the lead strap is ratchetably connected to the lashing strap, incrementally tensioning the lashing strap about a cargo load. A cam buckle slidably engages and releases the lead strap. The cam buckle is connected adjacent to the ratchet buckle by an apparatus other than the lead strap and the securing strap.

The ratchet buckle may be any known ratchet buckle suitable for lashing loads. In one embodiment, the ratchet buckle includes a bifurcated frame member having a pair of opposing arms between which a reel member and ratchet wheels are rotatably supported. The ratchet wheels are fixedly attached to the reel member in spaced apart relationship. A latching plate slidably mounted between the frame member arms for latching the ratchet wheels when the ratchet wheels are not being rotatably driven is also included. The lashing strap is wound around the reel member. A lever member is also included in the ratchet buckle. The lever member has a pair of opposing side members rotatably mounted on the reel member. Also included is a ratchet drive plate slidably mounted between the lever member arms for engaging and driving the ratchet it wheel when the lever member is actuated.

In one embodiment, the cam buckle includes a housing and a pawl movably mounted therein. The housing is adapted to slidably receive the lead strap, and has a pressure plate with a first restraining surface over which the lead strap slides. The pawl has a second restraining surface and is biased in an engaged position to restrain the lead strap between the first and second restraining surfaces, thereby preventing movement of the lead strap in a direction that loosens the lead strap while allowing movement of the lead strap in an opposite direction that tensions the lead strap. In one particular embodiment, the housing has a rear portion facing toward the ratchet buckle and a front portion facing away from the ratchet buckle. Passing the lead strap from the front portion to the rear portion of the housing tensions the lead strap and passing the lead strap from the rear portion towards the front portion of the housing loosens the lead strap. The pawl is constructed and arranged to engage and prevent movement of the lead strap in a direction from the front portion of the housing toward the rear portion of the housing while allowing movement of the strap from the rear portion of the housing to the front portion of the housing.

In another embodiment, the cam buckle includes a pawl having a first strap restraining surface and a finger-actuated lever on a side of the pawl opposing the first strap restraining surface, and a pivot pin about which the pawl rotates. A housing defining a second strap restraining surface opposing the first strap restraining surface and having two substantially parallel sides members supporting the pivot pin. A torsion spring, disposed about one end of the pivot pin, has a torque sufficient to maintain securely the first retraining surface of the pawl against the first restraining surface of the housing so as to cause the retraining surfaces to simultaneously contact the lead strap therebetween. This prevents movement of the lead strap in a direction that loosens the lead strap while allowing movement of the lead strap in a direction that tightens the lead strap. Rotation of the pawl lever causes the first retraining surface to rotate away from second retraining surface.

In another aspect of the invention a strap tensioner for tightening and releasing a lashing strap and a lead strap is disclosed. The strap tensioner includes a bifurcated frame member having a pair of opposing parallel arms between which a reel member around which the lashing strap is wound and ratchet wheels are rotatably mounted. A lever member rotatably mounted on the reel member and having a pair of opposing arms between which a ratchet drive plate is slidably mounted for engaging and driving the ratchet wheel when the lever member is actuated. A lead strap pressure plate, mounted between the frame member arms, is constructed and arranged to slidably receive the lead strap. The pressure plate has a first restraining surface over which the lead strap slides. A pawl having a second restraining surface is movably mounted between the opposing arms of the frame member such that the first and second restraining surfaces are in opposed juxtaposition. The pawl is biased such that the first and second restraining surfaces prevent movement of the lead strap in a direction that loosens the lead strap while allowing movement of the lead strap in an opposite direction that tensions the lead strap.

In one embodiment, the pressure plate has a rear end facing toward the ratchet buckle reel and a front end facing away from said ratchet buckle reel, the lead strap traveling from the front end to the rear end of the pressure plate when the lead strap is tensioned, and from the rear end towards the front end of the pressure plate when the lead strap is loosened. The pawl engages and prevents movement of the lead strap in a direction from the front end of the pressure plate toward the rear end of the pressure plate while allowing movement of the strap from the rear end of the pressure plate to the front end of the pressure plate.

In another aspect of the invention, a method for adjusting lead and lashing straps, each secured to a remote object, with a tensioning assembly connected between the lead and lashing straps is disclosed. The method includes (1) passing the lead strap in a tensioning direction through a cam buckle of the assembly. The cam buckle includes a housing having a pressure plate with a first restraining surface on a face thereof. A biased pawl having a second restraining surface movably mounted on the housing such that the first and second restraining surfaces prevent the lead strap from traveling in a loosening direction opposite the tensioning direction. Thus, passing the lead strap in a tensioning direction through a cam buckle of the assembly pre-tensions the lashing strap. The method also includes manipulating a ratchet buckle of the assembly connected adjacent to the cam buckle to incrementally tighten the straps. In certain embodiments the method also includes (3) depressing an extension lever on the pawl to lift the second restraining surface away from the first restraining surface, thereby allowing the lead strap to loosen, removing tension from the lashing strap.

In addition to the above-noted advantages, certain embodiments of the present invention provide additional advantages. For example, the present invention can be handled rapidly, comfortably and safely even by an untrained operator. The invention also enables an operator to quickly release the tensioned load simply by releasing the cam buckle by simple movement of the pawl operating lever to place the pawl in its unengaged position. Furthermore, the tensioning assembly is readily removably or demountable from the object. Also, the present invention enables for the pre-tensioning of a strap in a desired position before securely fastening the strap with the ratchet buckle in a tightened and secured position.

Further features and advantages of the present invention as well as the structure and operation of various embodiments of the present invention are described in detail below with reference to the accompanying drawings. In the drawings, like reference numerals indicate like or functionally similar elements or method steps. Additionally, the left-most one or two digits of a reference numeral identifies the drawing in which the reference numeral first appears.

BRIEF DESCRIPTION OF THE DRAWINGS

The foregoing, and other objects and advantages, will be understood more clearly from the following detailed description and from the accompanying figures. This description is given by way of example only and in no way restricts the scope of the invention. In the figures.

DETAILED DESCRIPTION

One aspect of the present invention is a ratchet and cam buckle tensioning assembly, interposed between a lashing strap tensioned by the ratchet buckle and a lead strap tensioned by the cam buckle, that enables an operator to quickly and conveniently pre-tension the lashing and lead straps by removing an un-tensioned length of the lead strap without having to operate the ratchet buckle. This enables the operator to utilize the ratchet buckle to tension the straps only when the requisite tensioning force cannot be provided by an unaided operator. This saves an operator from having to operate the ratchet buckle multiple times to uptake slack in the lashing strap when the leveraged tensioning force provided by such a ratchet buckle is unnecessary for such operations.

In the following description, the tensioning assembly is used in conjunction with flexible straps or belts. In particular, the disclosed embodiment of the tensioning apparatus can be harmoniously incorporated in textile lashing straps such as webbing. However, as one skilled in the relevant art would find apparent from the following description, any type of tensioning lines may be used with the present invention with minor or no modifications. For example, the tensioning assembly of the present invention may be used to restrain cargo loads or other objects using ropes, chains or other tie-down tensioning lines.

Figures 1, 2:
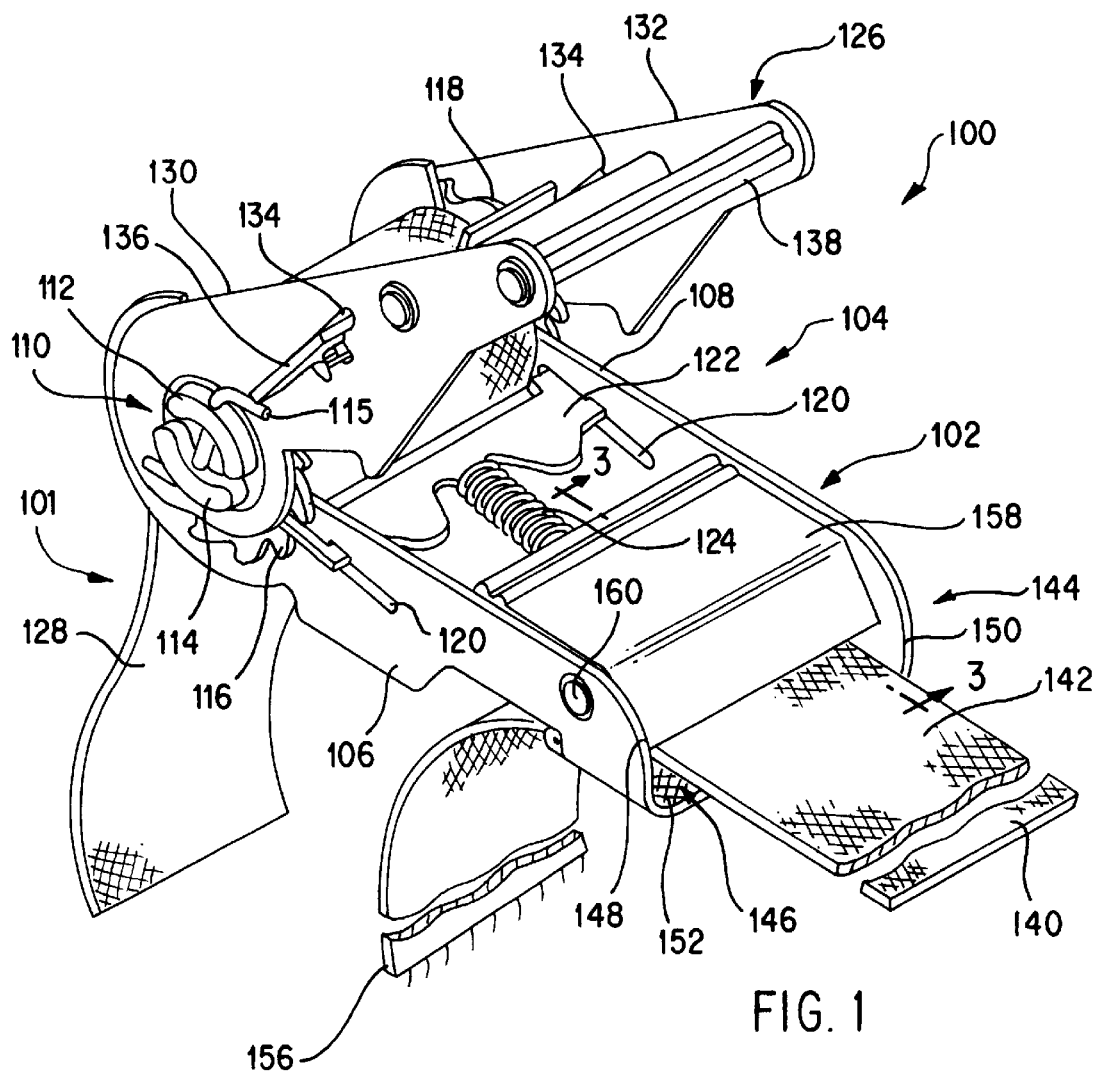
FIG. 1 is a perspective view of one embodiment of the ratchet and cam buckle of the present invention showing the ratchet buckle and cam buckle as integral units of a single device.
FIG. 2 is a perspective view of the cam buckle illustrated in FIG. 1 showing the teeth of the cam buckle which are applied to the strap.

FIG. 1 is a perspective view of one embodiment of the tensioning assembly 100 of the present invention having a ratchet buckle 101 with an integrated cam buckle 102. The ratchet buckle 101 may be any commonly used ratchet buckle now or later developed that is suitable for tightening or tensioning the selected tensioning lines such as webbing, straps and the like. For example, ratchet buckle 101 may be any of the conventional ratchet buckles disclosed in U.S. Pat. Nos. 2,889,136, 4,185,360, 4,227,286, 4,199,182, 4,324,023, 4,570,305, 4,542,883, 5,282,296, the specifications of which are hereby incorporated by reference in their entirety. It should be appreciated that ratchet buckles other than those disclosed in these exemplary patents may also be used and are considered to be within the scope of the present invention. Since the general features of ratchet buckle 101 are basically the same as that described in the aforementioned patents, only a brief description of one exemplary embodiment of ratchet buckle 101 follows, with emphasis on only those aspects that are related to the incorporation and use of cam buckle 102.

Ratchet buckle 101 includes a bifurcated frame member 104 which has a pair of oppositely positioned parallel arms 106 and 108. Reel member 110 is typically formed from a pair of bars 112, 114 which are joined together at their end portions by means of pins 115 (one shown in FIG. 1) and is rotatably mounted on frame member 104 between arms 106, 108. Mounted on reel member 110 in fixed positions relative thereto are a pair of ratchet wheels 116 and 118. Generally, ratchet wheels 116, 118 have web portions which run between the bars 112, 114 of reel 110 to prevent rotation of the wheels relative to the reel.

Mounted for longitudinal motion in slots 120 formed in arms 106, 108 offrame 104 is a latching plate 122. Latching plate 122 has a latching surface facing into ratchet wheels 116, 118. Latching plate 122 is slidably urged by a spring 124 which abuts at one end thereof against frame 104 and at the other end against the body of latching plate 122. This spring action forces the latching surface against ratchet wheels 116, 118 and holds the wheels in a latched condition at times other than when lever member 126 is being lifted away from frame member 104. The latching plate is secured in positioned and prevented from unseating from engagement with the teeth of the ratchet wheels until disengaged by the user.

A lashing strap 128 to be tensioned is incrementally wound around reel 110 as level member 126 is raised and lowered relative to frame 104. Lever member 126 has a pair of oppositely positioned parallel arms 130, 132 rotatably supported in reel 110 between ratchet wheels 116, 118. Slidably mounted in an elongated slot 134 formed in arms 130, 132 is a ratchet drive plate 136 which engages ratchet wheels 116, 118 in response to the urging of spring (not shown) against drive plate 136. Lever 126 further has a handle 138 to facilitate the manual movement thereof relative to frame 110.

Figure 3A:
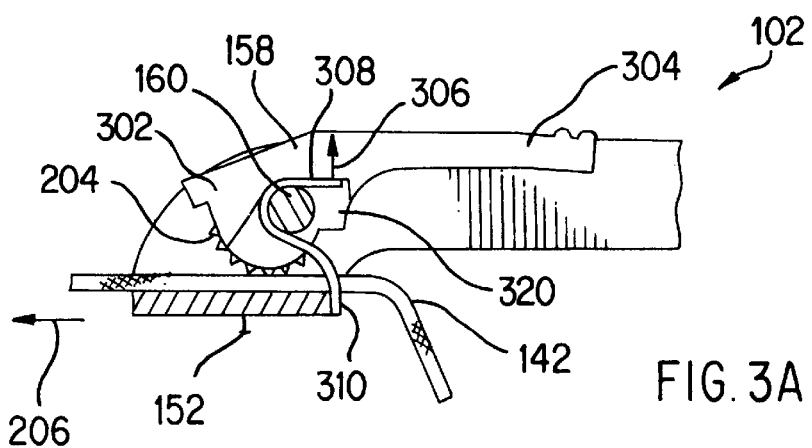
FIG. 3A is a side view of the cam buckle illustrated in FIG. 1 with a side of the ratchet buckle operating arm removed showing the cam buckle with the cam in its engaged position.
Figure 3B:
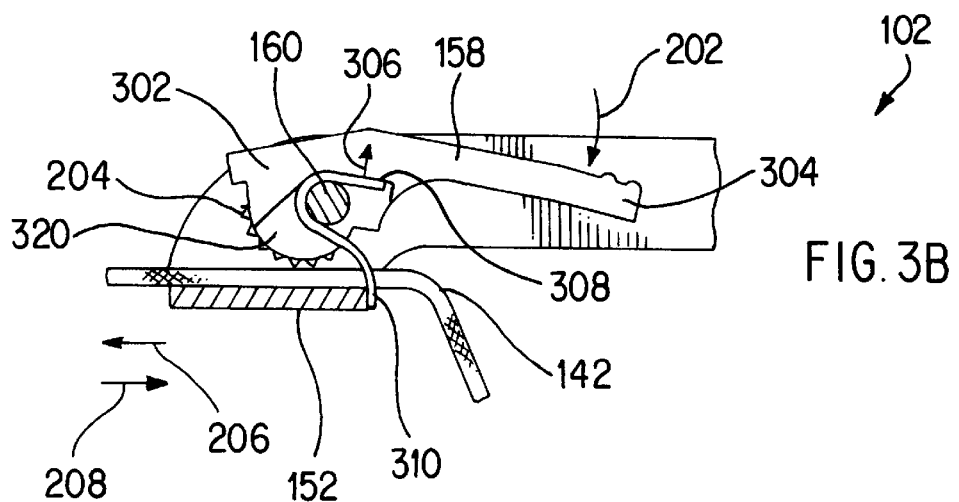
FIG. 3B is a side view of the cam buckle illustrated in FIG. 1 with a side of the ratchet buckle operating arm removed showing the cam buckle with the cam in its disengaged positioned.
Figure 4:
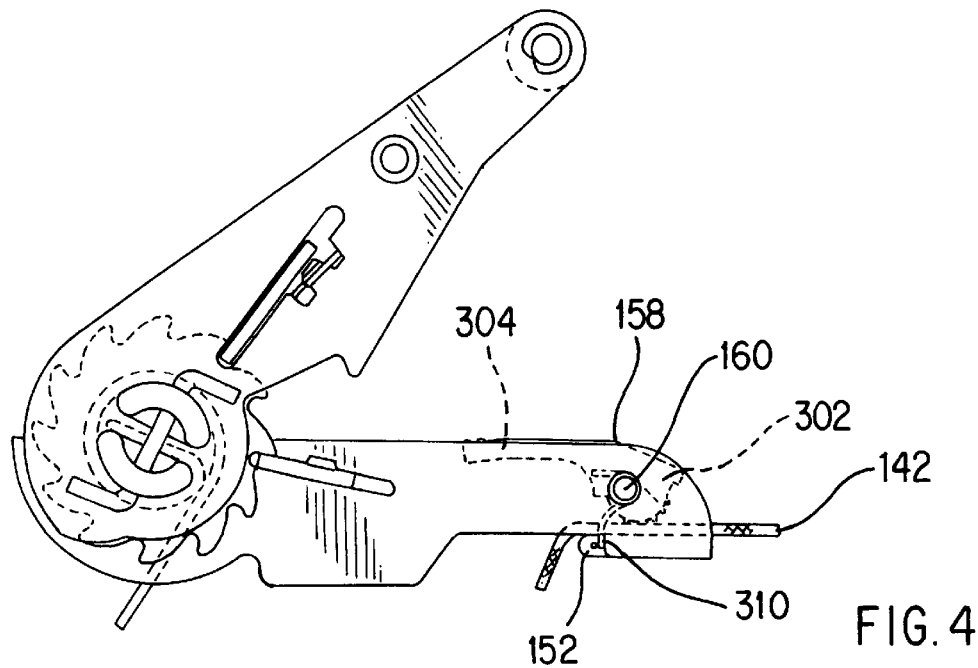
FIG. 4 is a side view of the complete assembly illustrated in FIG. 1 showing the cam buckle in phantom.

A free end 140 of lead strap 142 may be threaded through cam buckle 102, generally designated by reference numeral 102 in FIGS. 1–4. Cam buckle 102 will be described in detail below with reference to FIGS. 2–4. FIG. 2 is a perspective view of the cam buckle 102 illustrated in FIG. 1. FIGS. 3A and 3B are side views of the cam buckle illustrated in FIG. 1 with one side of the ratchet buckle frame arms removed to facilitate viewing of the cam buckle 102. FIG. 3A shows the cam buckle 102 with pawl 158 in an engaged position, while FIG. 3B illustrates cam buckle 102 with pawl 158 in a disengaged position. FIG. 4 is a side view of the tensioning assembly 100 illustrated in FIG. 1 showing the cam buckle 102 in phantom.

Cam buckle 102 includes a housing or frame 144 in which a pawl 158 is movably mounted so as to place a restraining surface 204 of pawl 158 in opposing juxtaposition with stationary restraining surface 146. These two restraining surfaces form a restraining region through which lead strap 142 passes. As will be described in detail below, cam buckle 102 preferably provides a unidirectional restraining region. In such an embodiment, cam buckle 102 prevents movement of lead strap 142 in a direction that loosens or releases tension on lead strap 142 (designated by arrow 206 in FIG. 2) while allowing movement in the opposite, tensioning direction (designated by arrow 208 in FIG. 2). In alternative embodiments, cam buckle 102 provides a bidrectional restraining region wherein movement of lead strap 142 is prevented in both directions 206, 208. This feature of the invention will be described in further detail below.

Housing or frame 144 is preferably a unitary, U-shaped member having opposing sides 148, 150, and a pressure plate 152 extending between housing sides 148, 150. In alternative embodiments, housing 144 is constructed of separate members, including side members 148, 150 and pressure plate 152. In such an embodiment, the members are secured together in a known manner to form housing 144.

In either such embodiment, it is preferable for cam buckle 102 to be integrated into ratchet buckle 101 as shown in FIGS. 1–4. That is, in a preferred embodiment, the cam buckle 102 and ratchet buckle 102 form single unit tensioning assembly 100. In the illustrative embodiment illustrated in FIGS. 2–4, sides 148, 150 of housing frame 14 and opposing arms 106, 108 are a unitary member. As shown, the side 148 and arm 106 are a single member; likewise, housing side 150 and arm 108 are a single unit. In other preferred embodiments described below, cam buckle 104 is a separate unit fixedly connected adjacent to ratchet buckle 102 via an apparatus other than lashing or lead straps 128, 142.

An opening 154 is formed adjacent to platform 152 in frame member 104 so that free end 140 of lead strap 142 may extend from below cam buckle 102 around platform 152 and passed through the restraining surfaces of pawl 158 and pressure plate or platform 152. The opposing end 156 of lead strap 142 is securable to any known object using any known means such as a hook or latch attached to, such as by stitching, into securable end 156. Generally, the opening 154 is provided by using a pressure plate 152 that is does not extend the length of the ratchet buckle frame member 104, while being of sufficient size to restrain the selected leader strap 142.

In the illustrative embodiment, the securable end 156 of leader strap 142 extends from below the pressure plate 152 to some object or surface from which the strap 142 is tensioned. This is a preferred approach in that the tension is not applied directed to the restraining region of the cam buckle 102, but rather indirectly around a rear end of the pressure platform 152. This enables the cam buckle 102 to withstand the application of greater tensile forces to leader strap 142. It should be understood, however, that the leader strap 142 may be reversed in alternative embodiments.

As noted, pawl 158 and pressure platform 152 each have a restraining surface suitable for engaging and preventing movement of lead strap 142. In embodiments wherein the tensioning line that is being operated upon by the cam buckle is a webbing, belt, strap or the like, the restraining surfaces are preferably friction surfaces. For example, in the embodiment illustrated in FIGS. 1–4, restraining surface 204 of pawl 158 and restraining surface 146 of pressure plate 152 include serrations. In another embodiment, restraining surface 204 includes serrations while restraining surface 146 includes substantially parallel grooves. Thus, in the illustrative embodiment wherein the tensioning line is a webbing, at least one restraining surface preferably has serrations. However, it should be understood that pressure plate 152 may have any friction surface 146 such as teeth, grooves, protrusions or the like over any portion of the pressure plate upper surface suitable for preventing movement of the selected tensioning lines in the desired direction (in unidirectional embodiments) or directions (in bidirectional embodiments).

As noted, pawl 158 is movably mounted on housing 144. In the illustrative embodiment, pawl 158 includes a cam portion 302 and an extension arm portion 304. Preferably the pawl 158 is a single unitary member, although the cam 302 and extension arm 304 may be manufactured separately and fixedly attached to each other in a known manner. In the illustrative embodiment, pawl 158 includes a channel through which a pivot pin 160 is received. Pivot pin 160 is firmly held within opposing coaxial apertures in housing sides 148, 150 against axial movement. It is also prevented from bending or moving in a direction parallel to the force exerted by lead strap 142 when lead strap 142 is in tension. Pawl 158 is pivoted on pin 160 so that when an operator exerts a downward pressure as shown by arrow 202 against extension arm 304 thereof, pawl 158 will pivot about pivot pin 160 against the force of a torsion spring 310 acting between pressure plate or platform 152 and pawl ledge 308.

Referring to FIG. 3A, leader strap 142 is held in position by friction surface 204 of cam 302. Torsion spring 310 is positioned within a recessed area 320, and is urged against an upper surface or ledge 308. Spring 310 is tensioned in the position shown in FIG. 3A so as to provide an upward force illustrated by arrow 306 against ledge 308 of cam 302. This causes cam 302 to rotate about pivot pin 160, applying friction surface 204 to leader strap 142 with a force determined by torsion spring 310. Thus, spring 310 maintains pawl 158 positioned so as to grip leader strap 142 between friction surface 204 of cam 302 and friction surface 146 of pressure platform 152.

As one skilled in the relevant art would find apparent, the selection and configuration of torsion spring 310 may be selected to provide a desired degree of holding power to accommodate a desired application of assembly 100. Such a selection may be desired to achieve a different balance of holding power between ratchet buckle 101 and cam buckle 102. In addition, the selection of spring 310 and its resulting spring force 306 must be capable of being overcome by force 202 in order to release leader strap 142. Force 202 required to overcome spring force 306 is also determined by the length and relative position of the extension arm, as is known in the art.

Cam portion 302 of pawl 158 is configured to be of an increasing radius so that leader straps of nearly any thickness may be held between restraining surfaces 204, 146. Thus, for thinner leader straps, cam portion 302 will rotate further under the influence of spring 310. Thus, a tensile force will tend to pull the restraining surface 204 of cam portion 302 closer to pressure plate 152, thereby exerting a larger gripping force on leader strap 142. As a result, leader strap 142 cannot be pulled out of cam buckle 102 unless lever 304 of pawl 158 is first depressed. The opposed restraining surfaces further increase the cam buckle's ability to withstand tensioning forces in the direction of arrow 208.

Referring to FIG. 3B, when it is desired to pass lead strap 142 through cam buckle 102 in direction 206, pawl 158 may be pivoted against the force of spring 302 by the operator, causing the serrated cam face 204 to pivot away from contact with lead strap 142 and pressure plate 152, releasing a previously applied tension on lead strap 142. Extension arm 304 extends from a side of cam 302 opposing friction surface 204. A force 202 applied to extension arm 304 causes pawl 158 to rotate against spring force 306, lifting friction surface 204 from pressure plate 152 and lead strap 142. Specifically, application of a force 202 in the direction shown causes cam 302 to rotate about pivot pin 160 against force 306 provided by spring 310. Cam 302 is configured such that the friction surface 204 is raised off of leader strap 142 when it is rotated as shown in FIG. 3B. As noted, this releases leader strap 142 enabling it to move in either direction as shown by arrows 266, 208.

Figure 5:
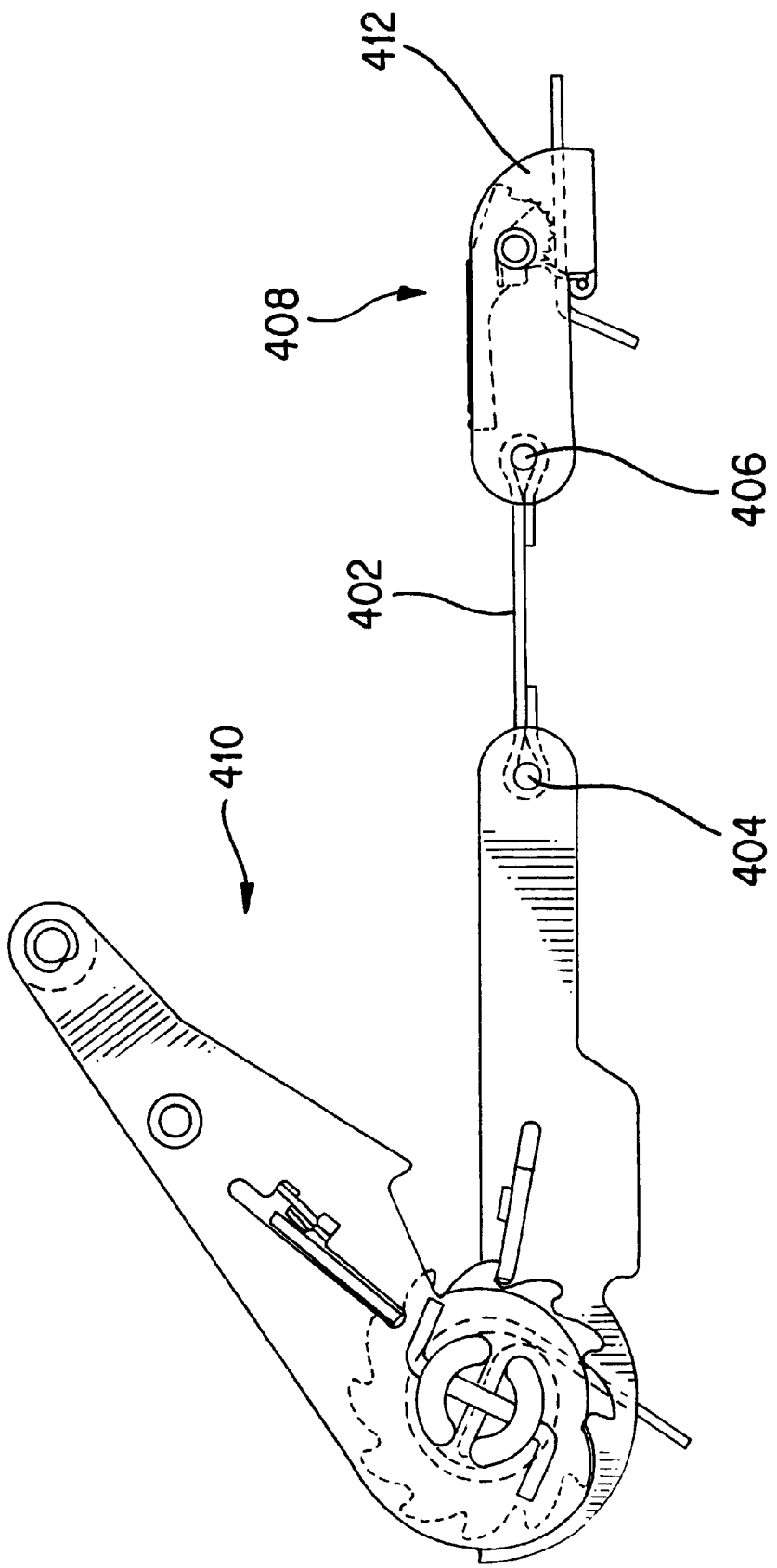
FIG. 5 is a side view of an alternative embodiment of the tensioning apparatus of the present invention.

In an alternative embodiment, the cam buckle is a separate unit connected adjacent to the ratchet buckle. FIG. 5 is a perspective view of an exemplary implementation of such an embodiment. As shown in FIG. 5, an intermediate strap 402 is used to fixedly attach or anchor a cam buckle 408 to a ratchet buckle 410. The ratchet buckle 410 may be a conventional ratchet buckle such as those disclosed in the aforementioned patents, or any special purpose ratchet buckle that incrementally tensions lashing strap 128.

Ratchet buckle 410 includes a bar member 404 that runs between arms 106, 108 of the frame 104. Likewise, cam buckle 408 includes a bar member 406 that is secured between parallel sidewalls 412 of a cam buckle housing 414. Intermediate strap 402 is permanently 175 attached to each bar member 404, 406. In one embodiment, the intermediate strap 402 is wrapped around each bar member 404, 406 and sewn to itself, such as by stitching. It should be of noted that a number of other types of apparatus may be used to fixedly adjacently connect the cam and ratchet buckles, including those that are rigid, such as by being hinged, as well as others that are flexible. They may be fixedly or removably attached to cam buckle 408 and ratchet buckle 410 in any known manner sufficient to withstand the tensile forces applied to the tensioning assembly during use.

When securing a load with the invention, the lead strap 142 is pulled through cam buckle 102 to quickly and easily remove any unnecessary length of lead strap 142, thereby pre-tensioning the tensioning assembly and, in particular, lashing strap 128. Ratchet buckle 101 is then operated in a convention manner to tighten/secure lashing strap 128 and lead strap 142. To loosen the tension on the secured load, a force is applied to extension arm 304, causing cam 302 to rotate, removing the biased force on lead strap 142. Lead strap 142 loosens under the tension previously applied to the lead strap 142 by the ratchet buckle 101. The lead strap 142 can then be manually pulled through cam buckle 102 to completely loosen the tensioning assembly. This enables the operator to make large adjustments in the length of the strap easily and quickly, eliminating the need to operate the ratchet multiple times to adjust the strap when the leveraged force of the ratchet is not necessary.

While various embodiments of the present invention have been described above, it should be understood that they have been presented by way of example only, and not limitation. For example, the above-described exemplary embodiment utilized webbing straps. In other embodiments wherein the tensioning lines are ropes or cables, the restraining surfaces may be friction surfaces or may take on a non-planar form and may not include a friction surface. For example, the restraining surfaces may each have a semi-circular cross-section with a gripping surface that, when they engage the rope or cable, they surround the tensioning line so as to prevent the desired movement thereof. It should also be appreciated that other moving means for moving pawl 158 against the urging of spring 310 from its engaged position to its unengaged position may be used and are considered to be within the scope of the present invention. In the illustrative embodiment, this moving means includes lever 304 which extends tangentially from the pawl cam 302. Alternative mechanical moving means that rotate pawl 158 about pivot pin 160 may be used and are considered to be within the scope of the present invention. These include, sliding, hinged and other well known mechanical means that assert a rotational force on cam 302. Furthermore, pawl 158 itself may be movably attached to housing 144 using other techniques. For example, the restraining surface 204 may be provided on a hinged member that is removably pressure fitted into an engaged position and removed with an upward force that drives the apparatus away from the pressure plate 152. In still alternative embodiments, a locking mechanism may be provided with cam buckle 102 to secure it in its engaged position as illustrated in FIG. 3A. This would prevent an inadvertent release of the leader strap 142. Thus, the breadth and scope of the present invention should not be limited by any of the above-described exemplary embodiments but should be defined only in accordance with the following claims and their equivalents.

What is claimed is:

1. A tensioning assembly for tightening and releasing a lashing strap and a lead strap, comprising:
 a ratchet buckle for incrementally tensioning the lashing strap, including,
  a bifurcated frame member having a pair of opposing parallel arms between which a reel member, around which a free end of the lashing strap is wound, and ratchet wheels are rotatably mounted, and a latching plate slidably mounted between said arms for latching said ratchet wheels when said ratchet wheels are not being rotatably driven, and
  a level member rotatably mounted on said reel member and having a pair of opposing side members between which a ratchet drive plate is slidably mounted for engaging and driving said ratchet wheel when the lever member is actuated; and
 a cam buckle constructed and arranged to slidingly engage and release the lead strap, said cam buckle connected adjacent to said ratchet buckle by an apparatus other than said lead strap and said securing strap, said cam buckle including,
  a housing adapted to slidably receive the lead strap, said housing including a pressure plate having a first restraining surface over which the lead strap slides; and
  a pawl, having a second restraining surface, movably mounted to said housing, said pawl biased in an engaged position to cause said first and second restraining surfaces to engage and prevent movement of the lead strap in a direction that loosens the lead strap, wherein in a disengaged position, said second restraining surface is spaced from said first restraining surface so as not to prevent lead strap movement.

2. The tensioning assembly of claim 1, wherein, when said pawl is in said engaged position, said pawl prevents movement of the lead strap in a direction that loosens the lead strap while allowing movement of the lead strap in an opposite direction that tensions the lead strap.

3. The tensioning assembly of claim 2,
wherein said housing has a rear end facing toward said ratchet buckle and a front end facing away from said ratchet buckle, the lead strap traveling from the front end to the rear end of said housing when the lead strap is tensioned, and from the rear end towards the front end of said housing when the lead strap is loosened; and
wherein said pawl is constructed and arranged to engage and prevent movement of the lead strap in a direction from the front end of said housing toward the rear end of said housing while allowing movement of the strap from the rear end of said housing to the front end of said housing.

4. The tensioning assembly of claim 1, wherein said cam buckle housing and said ratchet buckle frame member are a single, unitary element.

5. The tensioning assembly of claim 1, wherein said cam buckle is permanently attached adjacent to said ratchet buckle.

6. The tensioning assembly of claim 5, wherein said cam buckle and said ratchet buckle are permanently attached with an intermediate strap.

7. The tensioning assembly of claim 6,
wherein said frame member includes a first cross bar supported between said pair of opposing arms;
wherein said cam buckle includes side members attached to opposing sides of said pressure plate and a second cross bar supported between said side members; and
wherein said intermediate strap is fixedly connected to said first and second cross bars.

8. The tensioning assembly of claim 1, wherein said pawl is pivotally mounted to said housing.

9. The tensioning assembly of claim 8,
wherein said housing further comprises said pressure plate and a pair of substantially parallel side members fixedly attached to said pressure plate; and
wherein said pawl is pivotally mounted between said pair of housing side members such that said second restraining surface is in opposing juxtaposition to said first restraining surface.

10. The tensioning assembly of claim 9, wherein said cam buckle further comprises:
a pivot pin; and
a torsion spring, disposed about one end of said pivot pin with a first extension arm in contact with said pawl and a second extension arm in contact with said housing, said torsion spring having a torque sufficient to maintain securely said second restraining surface of said pawl against said first restraining surface of said housing.

11. The tensioning assembly of claim 1, wherein said cam buckle further comprises:
means for maintaining securely said second restraining surface of said pawl against said first restraining surface of said pressure plate.

12. The tensioning assembly of claim 1, wherein said second restraining surface comprises serrations.

13. The tensioning assembly of claim 12, wherein said first restraining surface comprises grooves.

14. The tensioning assembly of claim 1, wherein said cam buckle comprises:

a pawl having a first strap restraining surface and a finger-actuated lever on a side of said pawl opposing said first strap restraining surface;
a pivot pin about which said pawl rotates;
a housing defining a second strap restraining surface opposing said first strap restraining surface and having two substantially parallel sides members supporting said pivot pin; and
a torsion spring, disposed about one end of said pivot pin, having a torque sufficient to maintain securely said first retraining surface of said pawl against said second restraining surface of said housing to simultaneously contact said lead strap therebetween, preventing movement of said lead strap in a direction that loosens the lead strap while allowing movement of the lead strap in a direction that tightens the lead strap;
wherein rotation of said pawl lever causes said first restraining surface to rotate away from second restraining surface.

15. A cargo restraining device comprising:
a lashing strap having a free end and a securable end;
a lead strap having a free end and a securable end;
a ratchet buckle, interposed between said lashing strap and said lead strap, ratchetably connected to said free end of said lashing strap, said ratchet buckle incrementally tensioning said lashing strap about a cargo load, said ratchet buckle comprising:
a bifurcated frame member having a pair of opposing arms;
a reel member rotatably supported between said opposing arms;
ratchet wheels rotatably mounted between said frame arms and fixedly attached to said reel member in a spaced apart relationship;
a latching plate slidably mounted between said opposing arms for latching said ratchet wheels when said ratchet wheels are not being rotably driven, said lashing strap being wound around said reel member;
a lever member having a pair of opposing side members rotatably mounted on said reel member; and
a ratchet drive plate slidably mounted between said opposing side members of said lever member for engaging and driving said ratchet wheel when said lever member is actuated; and
a cam buckle that slidably engages and releases said lead strap, said cam buckle connected adjacent to said frame member by an apparatus other than said lead strap and said securing strap, said cam buckle comprising:
a housing adapted to slidably receive said lead strap, said housing having a pressure plate with a first restraining surface over which said lead strap slides; and
a pawl, having a second restraining surface, movably mounted to said housing, said pawl biased in an engaged position to restrain said lead strap between said first and second restraining surfaces so as to prevent movement of said lead strap in a direction that loosens said lead strap while allowing movement of said lead strap in an opposite direction that tensions said lead strap.

16. The cargo restraining device of claim 15,
wherein said housing has a rear end facing toward said ratchet buckle and a front end facing away from said ratchet buckle, wherein passing said lead strap from the front end to the rear end of said housing tensions said lead strap and passing said lead strap from said rear end towards said front end of said housing loosens said lead strap; and wherein said pawl is constructed and arranged to engage and prevent movement of said lead strap in a direction from said front end of said housing toward said rear end of said housing while allowing movement of said lead strap from said rear end of said housing to said front end of said housing.

17. The cargo restraining device of claim 15, wherein said cam buckle further comprises:

a pawl lever on a side of the pawl opposing said second strap restraining surface;

a pivot pin about which said pawl rotates, said housing having two substantially parallel side members supporting said pivot pin; and a torsion spring, disposed about one end of said pivot pin, having a torque sufficient to maintain securely said second restraining surface of said pawl against said first restraining surface of said housing to contact said lead strap therebetween so as to prevent movement of said lead strap in a direction that loosens said lead strap while allowing movement of said lead strap in a direction that tightens said lead strap, wherein rotation of said pawl lever causes said second restraining surface to rotate away from said first retraining surface.

18. The cargo restraining device of claim 15, wherein said housing of said cam buckle and said frame member of said ratchet buckle are a single, unitary element.

19. The cargo restraining device of claim 15, wherein said cam buckle is permanently attached adjacent to said ratchet buckle.

20. The cargo restraining device of claim 19, wherein said cam buckle and said ratchet buckle are permanently attached with an intermediate strap.

21. The cargo restraining device of claim 20, wherein said frame member of said ratchet buckle includes a first cross bar supported between said pair of opposing arms;

wherein said housing of said cam buckle includes a second cross bar supported between said side members; and wherein said intermediate strap is fixedly connected to said first and second cross bars.

22. The cargo restraining device of claim 15, wherein at least one of said first and second surfaces includes a friction surface.

23. A strap tensioner for tightening and releasing a lashing strap and a lead strap, comprising:

a bifurcated frame member having a pair of opposing parallel arms between which a reel member around which the lashing strap is wound and ratchet wheels are rotatably mounted;

a lever member rotatably mounted on said reel member and having a pair of opposing side members between which a ratchet drive plate is slidably mounted for engaging and driving said ratchet wheel when said lever member is actuated;

a lead strap pressure plate, mounted between said opposing arms of said frame member, constructed and arranged to slidably receive the lead strap, said pressure plate having a first restraining surface over which the lead strap slides; and a pawl, having a second restraining surface, moveably mounted between said opposing arms of said frame member such that said first and second restraining surfaces are in opposed juxtaposition, said pawl biased such that said first and second restraining surfaces contact and prevent movement of the lead strap in a direction that loosens the lead strap while allowing movement of the lead strap in an opposite direction that tensions the lead strap.

24. The strap tensioner of claim 23, wherein said pressure plate has a rear end facing toward said reel of said ratchet buckle and a front end facing away from said reel of said ratchet buckle, the lead strap traveling from the front end to the rear end of said pressure plate when the lead strap is tensioned, and from the rear end towards the front end of said pressure plate when the lead strap is loosened; and wherein said pawl engages and prevents movement of the lead strap in a direction from the front end of said pressure plate toward the rear end of said pressure plate while allowing movement of the strap from the rear end of said pressure plate to the front end of said pressure plate.

25. A cargo restraining device comprising:

a lashing strap having a free end and a securable end;

a lead strap having a free end and a securable end;

a ratchet buckle, interposed between said lashing strap and said lead strap, ratchetably connected to said free end of said lashing strap, said ratchet buckle incrementally tensioning said lashing strap about a cargo load, and wherein said ratchet buckle comprises:

a bifurcated frame member having a pair of opposing arms;

a reel member rotatably supported between said opposing arms;

ratchet wheels rotatably mounted between said frame arms and fixedly attached to said reel member in spaced apart relationship;

a latching plate slidably mounted between said opposing arms for latching said ratchet wheels when said ratchet wheels are not being rotatably driven, said free end of said latching strap being wound rid around said reel member;

a lever member having a pair of opposing side members rotatably mounted on said reel member; and a ratchet drive plate slidably mounted between said opposing side members of said lever member for engaging and driving said ratchet wheel when said lever member is actuated; and a cam buckle that slidably engages and release said free end of said lead strap, said cam buckle connected adjacent to said ratchet buckle by an apparatus other than the lead strap and the securing strap, said cam buckle and said lead strap cooperating to prevent movement of said lead strap relative to said cam buckle in a direction that loosens said lead strap whole allowing movement of said lead strap relative to said cam buckle in an opposite direction that tensions said lead strap, wherein said cam buckle includes:

a housing adapted to slidably receive said free end of said lead strap, said housing having a pressure plate with a first restraining surface over which said lead strap slides; and a pawl, having a second restraining surface, movably mounted to said housing, said pawl biased in an engaged position to restrain said lead strap between said first and second restraining surfaces.

26. The cargo restraining device of claim 25, wherein said housing of said cam buckle and said frame member of said ratchet buckle are a single, unitary element.

27. The cargo restraining device of claim 25, wherein said cam buckle is permanently attached adjacent to said ratchet buckle.

28. The cargo restraining device of claim 27, wherein said cam buckle and said ratchet buckle are permanently attached with an intermediate strap.

29. The cargo restraining device of claim 28,
   wherein said frame member of said ratchet buckle includes a first cross bar supported between said pair of opposing arms;
   wherein said housing of said cam buckle includes a second cross bar supported between said side members; and
   wherein said intermediate strap is fixedly connected to said first and second cross bars.

30. A cargo restraining device comprising:
   a lashing strap having a free end and a securable end;
   a lead strap having a free end and a securable end;
   a ratchet buckle, interposed between said lashing strap and said lead strap, ratchetably connected to said free end of said lashing strap, said ratchet buckle incrementally tensioning said lashing strap about a cargo load;
   a cam buckle that slidably engages and release said free end of said lead strap, said cam buckle connected adjacent to said ratchet buckle by an apparatus other than the lead strap and the securing strap, said cam buckle and said lead strap cooperating to prevent movement of said lead strap relative to said cam buckle in a direction that loosens said lead strap whole allowing movement of said lead strap relative to said cam buckle in an opposite direction that tensions said lead strap, wherein said cam buckle includes:
   a housing adapted to slidably receive said free end of said lead strap, said housing having a pressure plate with a first restraining surface over which said lead strap slides;
   a pawl, having a second restraining surface, movably mounted to said housing, said pawl biased in an engaged position to restrain said lead strap between said first and second restraining surfaces;
   a pawl lever on a side of said pawl opposing said second strap restraining surface;
   a pivot pin about which said pawl rotates, said housing having two substantially parallel sides members supporting said pivot pin; and
   a torsion spring biasing said pawl and having a torque sufficient to maintain securely said second restraining surface of said pawl against said first restraining surface of said housing to contact said lead strap therebetween,
   wherein rotation of said pawl lever causes said second restraining surface to rotate away from said first restraining surface.

* * * * *